United States Patent [19]

Schiller et al.

[11] Patent Number: 4,868,876
[45] Date of Patent: Sep. 19, 1989

[54] ELECTROSTATIC DISCHARGE PROTECTION DEVICE

[75] Inventors: Kurt Schiller, Mering; Johann Luger, Munich; Hans Schierl, Steinhoering; Heinrich Kallhardt, Munich, all of Fed. Rep. of Germany

[73] Assignee: Siemens Aktiengesellschaft, Berlin and Munich, Fed. Rep. of Germany

[21] Appl. No.: 52,657

[22] Filed: May 20, 1987

[30] Foreign Application Priority Data

May 27, 1986 [DE] Fed. Rep. of Germany ....... 3617722

[51] Int. Cl.$^4$ .......................... H04R 1/03; H02H 1/04; H02H 3/22; H05F 3/00
[52] U.S. Cl. ..................................... 379/437; 361/91; 361/117; 361/118; 361/119; 379/433; 379/440; 379/451
[58] Field of Search ............... 379/437, 387, 419, 440, 379/451, 433; 361/220, 42, 117–119, 91

[56] References Cited

U.S. PATENT DOCUMENTS

| | | | |
|---|---|---|---|
| 3,665,570 | 5/1972 | Brooks | 361/212 |
| 4,040,120 | 8/1977 | Geadah et al. | 379/428 |
| 4,271,333 | 6/1981 | Adams et al. | 379/370 |
| 4,303,960 | 12/1981 | Sherwood et al. | 361/212 |
| 4,440,980 | 3/1984 | Bakker | 361/119 |
| 4,440,990 | 3/1984 | Nozaki | 200/5 A |
| 4,456,800 | 6/1984 | Holland | 361/212 |
| 4,586,106 | 4/1986 | Frazier | 361/220 |
| 4,667,266 | 5/1987 | Masuoka et al. | 361/212 |
| 4,821,320 | 4/1989 | Andert et al. | 379/437 |

Primary Examiner—Jin F. Ng
Assistant Examiner—Danita R. Byrd
Attorney, Agent, or Firm—Mark H. Jay

[57] ABSTRACT

An electrically conductive network which, at one end, has a low-resistance connection with a user's hand and, at the other end, has a high-resistance connection with ground. This protects electrical equipment such as a telephone keyset from electrostatic discharge and also protects the user from unpleasantly high discharge currents.

10 Claims, 1 Drawing Sheet

ELECTROSTATIC DISCHARGE PROTECTION DEVICE

BACKGROUND OF THE INVENTION

The invention relates to protective devices, and more particularly relates to protective devices which protect electrical equipment and those who use it from electrostatic discharge. In its most inmmediate sense, the invention relates to an electrostatic discharge protection device for use in telephone keysets.

Electrostatic discharge is often encountered with, e.g., telephone keysets and other electronic devices that are used in the home or in the office. Where a user accumulates an electrostatic charge by walking on carpeting or by sitting on upholstered furniture, the charge may be dissipated through, e.g., a telephone keyset when the user picks up the receiver. Because relatively high electrostatic voltages can be built up, electrostatic discharge can be painful because the discharge current can be relatively high. Furthermore, such high currents can generate strong electromagnetic fields; these can induce voltages in sensitive electronic equipment and damage it.

Originally, attempts to reduce the current produced during electrostatic discharge were directed to increasing the dielectric strength of the housing of, e.g. telephone keysets. Such results can be obtained by, e.g. using intermediate layers of insulation and thereby increasing the distance between the sensitive electronic circuitry and the user's hand. However, such attempts have proved unsatisfactory because high electrostatic voltages require entirely new housing structures.

It would be advantageous to provide a device which would protect both a piece of electronic equipment and the user of such equipment from electrostatic discharge.

SUMMARY OF THE INVENTION

In accordance with the invention, the equipment to be protected is provided with an electrically conductive network which is so located that the user will make electrical contact with it when he grasps the apparatus. The network includes a low resistance in series with a high resistance. The high resistance is grounded, and the user makes electrical contact with the low resistance.

Because the electrostatic discharge takes place through the high resistance, the discharge current is limited to a relatively low value and this makes the discharge unnoticeable to the user. Because the discharge current is low, the resulting electromagnetic field is relatively weak, which considerably reduces the likelihood of damage caused by induced voltages. Thus, both the user and the equipment are protected.

Advantageously, the conductive network can be formed by a layer placed on the inside of the equipment housing and forming a connection with those parts which a user grasps to use the equipment. Thus, for example, in the case of a telephone keyset, the electrically conductive material can be applied on one of the two housing parts of the handset in such a way that it extends to the encircling boundary between the parts and thus makes an electrical connection with the operator. This layer can alternatively be formed by a metal foil or an electrically conductive synthetic foil.

The high resistance can be formed by a discrete structural element or by a resistive paste applied to a carrier. The resistive paste can, for example, be applied on a carrier foil by a screen printing process permitting cost-effective mass production. This carrier can be provided with recesses with contact devices, which can be mounted on the structural elements to be protected. Using the carrier foil, the bonding devices can be fashioned as lobes projecting into the recess, connected with each other and with the high resistance, which are installed in the telephone handset, for example at the metal housing of the speaker.

BRIEF DESCRIPTION OF THE DRAWINGS

Exemplary and non-limiting preferred embodiments of the invention are shown in the drawings, in which.

DETAILED DESCRIPTION OF PREFERRED EMBODIMENTS

Figure 1:
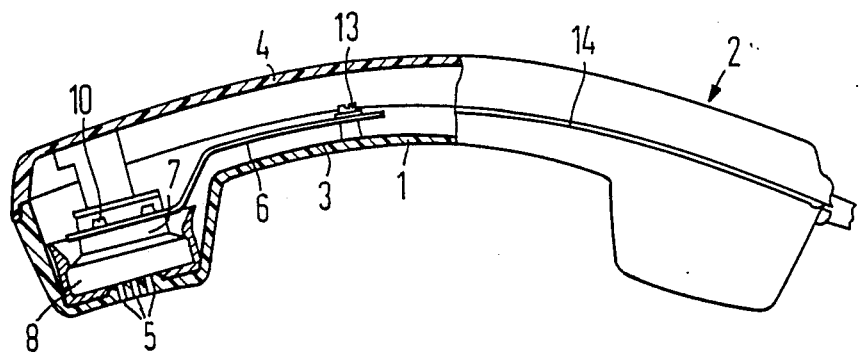
FIG. 1 shows in partial section a side view of a handset incorporating a preferred embodiment of the invention.
Figure 2:
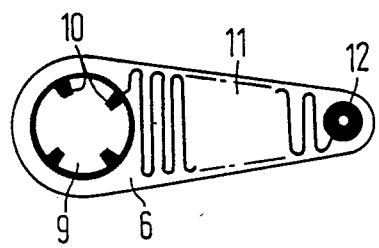
FIG. 2 shows a top view of a preferred embodiment of the invention.

In the present embodiment, protection for a telephone handset and for the person operating it are illustrated, but the invention is not limited to this application.

A handset 2 is formed from two housing half-shells 1 and 4. The half-shell 1 has a conductive paste applied to all or a part of its inner surface. This paste can, for example, be applied using an adhesive spray process. In this process, the conductive paste is so applied that it spreads to the circumferential boundary line 14 which separates the half-shells 1 and 4, so that through the paste an electrical connection with the operator (not shown) may be established. The conductive paste 3 also coats the ports 5 in the half-shell 1, which ports 5 are located in the speaker region so that sound can be transmitted to the user's ear. This conductive paste which has a relatively low resistance can be replaced, for example, by an appropriate metal foil or conductive synthetic foil, the foil in the last mentioned case serving a decorative function at the boundary line 14.

Within the handset 2 an additional resistive foil 6 is fastened in that region of the half-shell 1 where the conductive paste 3 is applied. The resistive foil 6, which can, for example, be produced by screen printing, has a circular cut-out 9 corresponding approximately to the outer diameter of the metal housing 7 of the speaker 8. Into the center of this cut-out 9 point several lobes 10 which are printed with conductive paste and which are connected with each other in the shape of a ring. These lobes 10 are connected over a zig-zag high resistance resistor 11. Resistor 11 consists of resistive paste the resistor having an ungrounded end at terminal 12 and a grounded end at lobes 10 which is grounded through an electrical path (not shown). Bonding of the resistive foil 6 with the speaker 8 takes place by attaching the foil 6 with the area having the cut-out 9, whereby the lobes 10 are placed on and electrically connected to the metal housing 7. The electrical connection of the resistive foil 6 with the conductive paste 3 within the housing part 1 of the handset 2 takes place through the terminal 12 and screw 13. Discharge of an electrostatic charge then takes place through a high-resistance path 6 through metal housing 7 to ground.

Those skilled in the art will understand that changes can be made in the preferred embodiments here described, and that these embodiments can be used for other purposes. Such changes and uses are within the scope of the invention, which is limited only by the claims which follow.

What is claimed is:

1. A device for use with electronic apparatus to dissipate electrostatic charges which have accumulated on users of the device, comprising:
   means for establishing a low resistance connection with the user; and
   a high resistance means having a grounded end and an ungrounded end, the ungrounded end being electrically connected to said establishing means.

2. The device of claim 1, wherein said establishing means comprises an electrically conductive layer which is located inside the apparatus and which is electrically connected to electrical components therein.

3. The device of claim 2, wherein the layer comprises an electrically conductive paste.

4. The device of claim 2, wherein the layer comprises metal foil.

5. The device of claim 2, wherein the layer comprises electrically conductive synthetic foil.

6. The device of claim 1, wherein the high resistance means is a discrete component.

7. The device of claim 1, wherein the high resistance means comprises a carrier to which a resistive paste is applied.

8. The device of claim 7, wherein the carrier has an opening shaped to receive a conductive electrical component of the apparatus to be protected, and wherein the carrier has regions which serve as terminals making electrical contact with said conductive electrical component.

9. The device of claim 1, wherein the apparatus comprises a handset and said establishing means comprises an electrically conductive material which is so located as to make electrical contact with a user who grasps the handset.

10. The device of claim 9, wherein the handset has a speaker and ports transmitting sound from the speaker and wherein the electrically conductive material coats said ports.

* * * * *